April 15, 1952  C. W. FISCHER  2,593,129
CONTROL MECHANISM
Filed Feb. 25, 1946  3 Sheets-Sheet 1

INVENTOR.
Carl W. Fischer,
BY

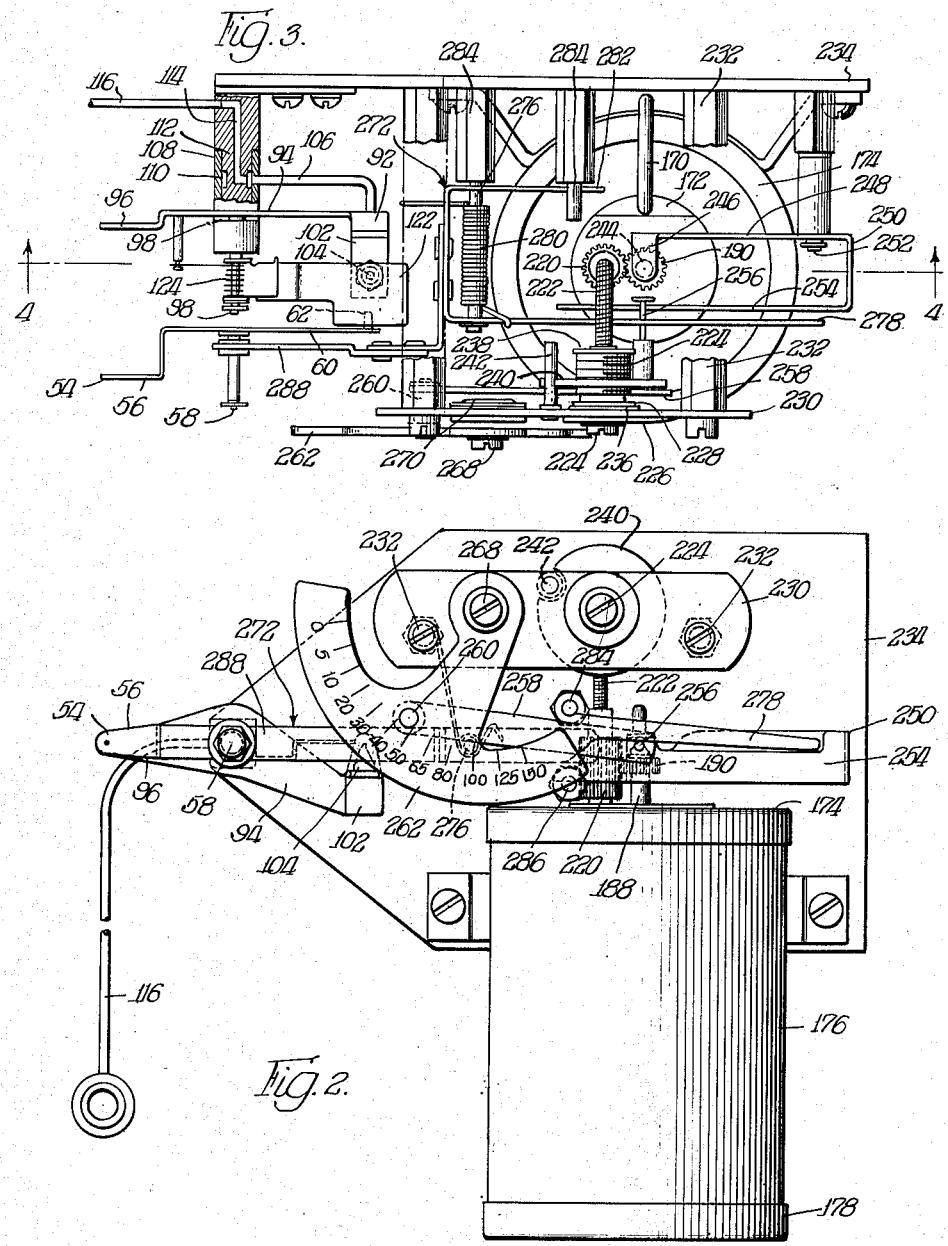

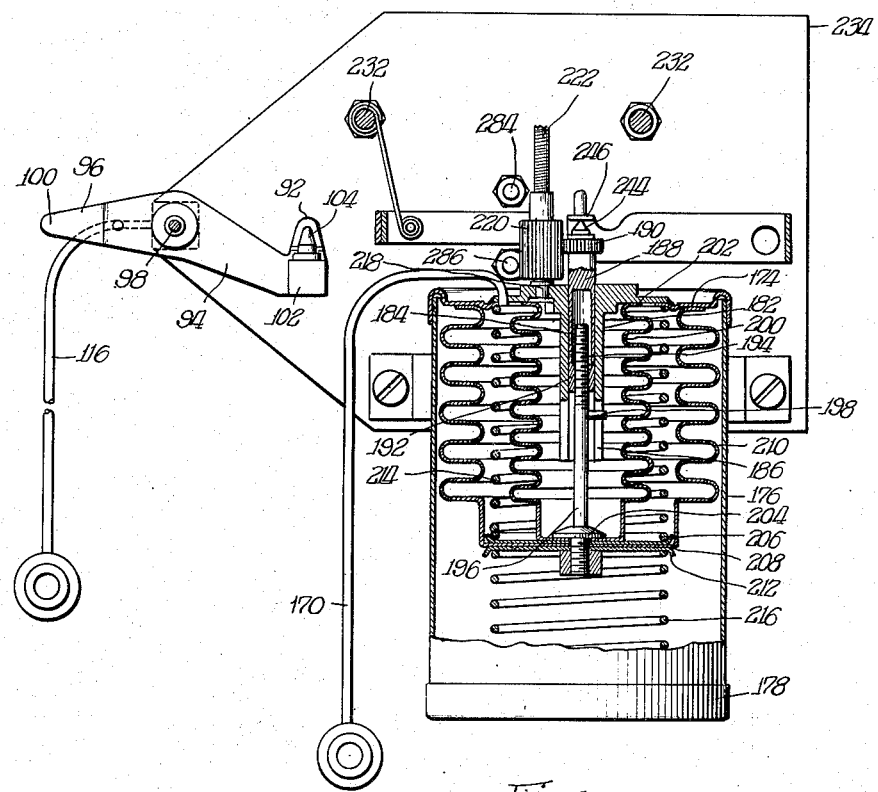
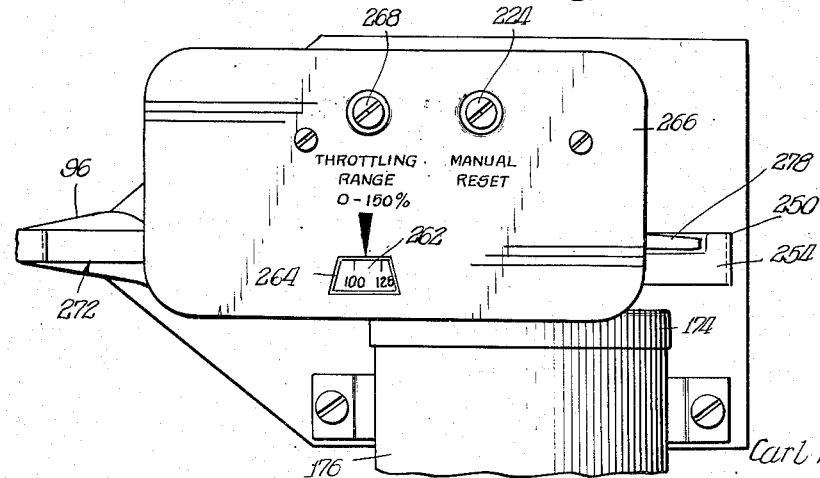

Patented Apr. 15, 1952

2,593,129

UNITED STATES PATENT OFFICE 2,593,129

CONTROL MECHANISM

Carl William Fischer, Chicago, Ill., assignor to
The Powers Regulator Company, Chicago, Ill.,
a corporation of Illinois Application February 25, 1946, Serial No. 649,959

5 Claims. (Cl. 137—153)

This invention pertains to regulating mechanism and more particularly, to a regulator for controlling and recording either temperature or pressure.

In some installations it is desired to maintain a selected, substantially constant, temperature or pressure, and in order to do this it is desirable to accurately control a valve or the like so that the valve supplies a predetermined temperature or pressure therethrough. And it is desirable that the selected temperature or pressure at a predetermined point be maintained a steady constant with as little fluctuation as possible.

An object of the invention is to provide a regulating device of great sensitivity which can be set to more accurately control the condition to be maintained.

Another object of the invention is to provide regulating means to accurately control the conditions to be maintained, whereby there is means provided at the place where the conditions are to be maintained to properly proportion the variable at the place, such as the heating or cooling medium, or the pressure.

Another object of the invention is to provide a regulating device for controlling conditions to be maintained, such as temperature or pressure, the device itself being so constructed and arranged that it not only shows the selected temperature or pressure to be maintained, but also shows the temperature or pressure at any instant and records the same over a period of time.

Another object of the invention is to provide a regulator for temperature or pressure which can be readily changed or set for direct or reverse acting control after installation or at the installation, without the necessity of structurally modifying any of the parts thereof.

Another object of the invention is to provide a regulator for controlling temperature or pressure which can be readily adjusted on the job for reverse or direct acting control.

Another object of the invention is to provide a regulator for controlling temperature or pressure conditions wherein the temperature or pressure control element does not directly operate the control means for maintaining the conditions, but serves to pilot the control thereof, that is, a temperature or pressure sensitive element is utilized to control operating means which in turn causes actuation of the medium control device.

Another object of the invention is to provide a throttling range adjustment which can be adjusted without removing any parts of the device.

Another object of the invention is to provide a throttling range adjustment providing a dial which reads directly at throttling range.

Another object of the invention is to provide a rotary adjustment for throttling mechanism instead of the usual sliding adjustment which is susceptible of slippage and is awkward to adjust.

Another object of the invention is to provide an instrument, during the adjustment of which there is no interference with the operation of the device so that it continues to operate during adjustment and can thus be more accurately adjusted.

With these and various other objects in view, the invention may consist of certain novel features of construction and operation as will be more fully described and particularly pointed out in the specification, drawings and claims appended hereto.

In the drawings which illustrate embodiments of the device and wherein like reference characters are used to designate like parts—

Figure 2 is an enlarged side elevation of the control mechanism embodying the invention with the throttling range dial plate removed;

Figure 3 is a top plan view of the control mechanism illustrated in Figure 2;

Figure 4 is a sectional elevation taken substantially in the plane as indicated by the line 4—4 of Figure 3; and, Figure 5 is a fragmentary side elevation of the throttling range and dial plate for the control mechanism illustrated in Figures 1 to 4 inclusive.

Figure 1:
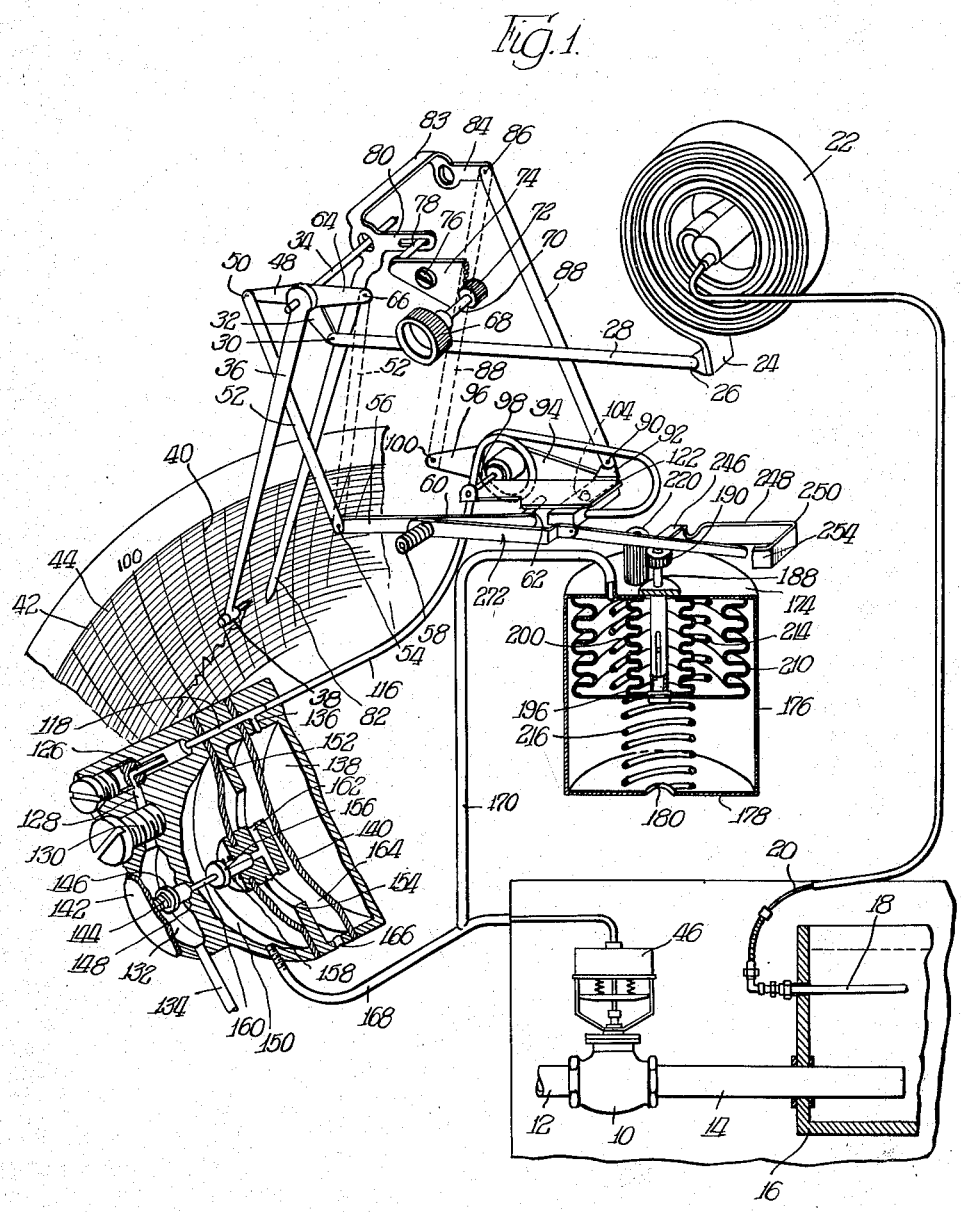
Figure 1 is a fragmentary, diagrammatic elevation of a temperature control system provided with the control mechanism embodying the invention.

Control instruments embodying the control mechanism illustrated herein may be of two types; those controlling temperature and those controlling pressure, and the mechanisms for controlling pressure and temperature are essentially the same.

In the embodiment illustrated in Figure 1 a temperature control is illustrated. In Figure 1 the temperature of the medium to be controlled is shown as controlled by the control valve 10 connected as through pipe 12 to a source of temperature supply, the temperature of the medium supplied through the valve passing through pipe 14 to the medium to be controlled in receptacle 16. Temperature bulb 18 extends into the receptacle 16 and is subjected to the temperature of the medium to be controlled. The bulb 18 is of the usual construction, and is connected through the armoured pressure tube 20 to the inner fixed end of the spiral Bourdon tube 22, the tube 22 at its closed outer end 24 being pivotally connected as at 26 to one end of the link 28. Where pressure is to be controlled as through a valve similar to valve 10, the bulb 18 and tube 20 would be replaced by a pressure sensitive device.

The other end of the link 28 is pivoted as at 30 to the lever 32, the shaft 34 on which said lever is mounted being provided with the arm 36 of recording pen 38. The recording pen 38 is adapted to record movement of the arm 36 on a suitable record dial 40, said dial being provided with time lines 42 which are concentric with the axis of shaft 34 at the instant that they cross the writing tip of pen 38. The chart also is provided with the temperature lines 44 which are concentric with the axis of rotation of the chart. The chart rotates in a predetermined manner, such as for example by a time motor whereby the chart makes one rotation for every 24 hours, or any other selected period, and whereby a reading of the chart can be had at any time by the line traced by the pen 38.

Assuming that the valve 10 is a direct acting motorized valve, that is, as the supply of pressure is increased to the motor 46, the valve is moved toward closed position. With such a direct acting motorized valve the shaft 34 is provided with an arm 48 pivoted as at 50 to the link 52, which in turn is pivoted at 54 to the lever 56, said lever 56 being pivoted as at 58 to the flapper controlling arm 60 provided with the flapper operating pin 62. Where the motorized valve 46—10 is a reverse acting motorized valve, that is, one that opens with an increase in pressure, arm 64 fixed to shaft 34 is adapted to be pivoted at 66 to the link 52, as shown in dotted lines in Figure 1.

A setting knob 68 having a shaft 70 is provided having the pinion 72 adapted to engage the teeth of quadrant 74. The quadrant 74 is pivoted as at 76 and is loosely connected through the pin and slot connection 78 to arm 80 disposed to pivot about the axis of shaft 34, arm 80 being provided with the pointer 82, set by knob 68 to the selected temperature (or pressure) to be maintained at the medium to be controlled. This pointer 82 is read on dial 40. Arm 80 is connected through member 83 with arm 84 also pivoted about the axis of shaft 34.

Arm 84 is pivotally connected as at 86 to one end of link 88, the other end of link 88 being pivoted as at 90 to the bracket 92 provided on the nozzle-arm 94. The disposition of the parts is shown in full line for a direct acting motorized valve. Where a reverse acting motorized valve is utilized, arm 94 is provided with the arm 96 disposed on the opposite side of the pivot 98 from bracket 92 for connection of the link 88 at 100 as illustrated in dotted lines in Figure 1.

Arm 94 is provided with the nozzle block 102 provided with the nozzle 104, the block and nozzle being connected through pressure tube 106 to the bushing 108 which communicates with the circular channel 110 provided in the shaft 112 which is aligned with pivots 98 and 58. Channel 110 communicates with passage 114 connected to the pressure tube 116 which communicates with passage 118 of relay 120 (Figure 1). Flapper 122 is also pivoted about pivot 98, being provided with a portion overlying the nozzle 104 and forming a valve therewith, and also being provided with a portion overlying pin 62, the flapper being urged toward nozzle 104 by means of the spring 124 (Figure 3).

Passage 118 of relay 120 (Figure 1) is connected through the restricted orifice 126, passage 128 and through filter 130 to the supply pressure valve cavity 132, which in turn is connected through tube 134 to a suitable source of pressure supply (not shown). Passage 118 communicates through passage 136 with the low pressure cavity 138 below the low pressure diaphragm 140.

Supply pressure cavity 132 is closed by means of the cap 142, and spring 144 is provided between said cap and the supply valve 146, said valve being adapted to control the passage 148 between said cavity 132 and the high pressure cavity 150 disposed above the high pressure diaphragm 152. An exhaust valve seat 154 is carried by the high pressure diaphragm 152, being provided with the exhaust valve 156 urged toward open position by means of the spring 158 but controlled by the valve stem 160 of the supply valve 146. Valve 156 controls the passage 162 communicating with the atmospheric pressure compartment 164 which is open to the atmosphere through passage 166.

The high pressure cavity 150 is connected through the pressure tube 168 to the motor 46 whereby pressure supplied to the motor controls the valve 10. Pressure tube 168 is also connected to tube 170 which is connected through a suitable boss 172 (Figure 3) provided on the end cap 174 of the bellows housing or casing 176. Casing 176 is closed at its opposite end with the end cap 178 which is provided with the aperture 180 whereby the inside of the casing communicates with the atmosphere. End cap 174 is provided with the pinion bearing 182 (Figures 1 and 4) secured thereto and being provided with the smooth bore 184 provided adjacent the lower end thereof with guide slots 186.

Pinion shaft 188 is adapted to be fitted or journalled in the bore 184 and is provided adjacent the top thereof with the pinion 190, the shaft adjacent the lower end being threaded as at 192 for the reception of complementary threads 194 provided on the adjusting shaft 196; said shaft being provided with the guide pin 198 adapted to be received in one of the slots 186. Rotation, therefore, of shaft 188 causes relative movement of translation between shaft 188 and shaft 196. Inner bellows seal 200 is secured at its open end as at 202 to the cap 174 and extends downwardly, and is permanently secured as at 204 to the spring seat 206 and to the closed end 208 of the outer bellows 210 which is also provided with the spring seat 212 secured by the securing means 204. Securing means 204 provides a seat for the lower end of shaft 196.

A spring 214 is interposed between the cap 174 and spring seat 206 urging said bellows to elongate, which action is resisted by the spring 216 interposed between the spring seat 212 and cap 178. Spring 216 is stiff enough so that at zero pressure the effect of spring 214 and the spring effect of the bellows 210 and 200 is balanced when the shaft 196 is moved upwardly to a predetermined position. Boss 172 is so arranged that tube 170 communicates with the space between the bellows 200 and 210.

Pinion bearing 182 is provided with the stud 218 (Figure 4) on which the elongated pinion 220 is rotatably mounted, said pinion meshing with pinion 190. Pinion 220 is provided with the flexible shaft 222 which is connected at its outer end to the manual reset screw 224, said screw being rotatably mounted by collars or disks 226 and 228 to bracket 230 which is secured as at 232 to the supporting bracket 234.

A friction washer 236 is disposed between the plate 230 and the disk 228, and at the opposite end of the screw member 224 there is disposed plate 238 which acts as a stop for the disk 240 which is provided with complementary threads to the screw member 224, whereby it travels between stops 228 and 238, pin 242 being provided to prevent rotation of the disk 240. By providing the stops 228 and 238 and disk 240, safety means is provided for preventing distortion of the shaft 222 by rotating the screw 224 too far.

Shaft 188 is provided with the conical stop 244 disposed above pinion 190 and stop 244 is adapted to be engaged by projection 246 of lever arm 248 of pinion shaft lever 250. Lever 250 is pivoted as at 252 to the support 234. Pinion shaft lever 250 is also provided with the fulcrum pin arm 254, said arm being adapted to be engaged by fulcrum pin 256 provided on link 258 which in turn is pivoted as at 260 to the throttling range dial 262. The dial is calibrated and is adapted to be read through the window 264 of throttling range dial plate 266 (Figure 5). The dial 262 is provided with the setting screw 268 provided on the mounting stud 270 (Figure 3) frictionally mounted on the plate 230.

Flapper arm lever indicated generally at 272 is pivoted as at 276 to the plate 234 and is provided with the fulcrum pin lever arm 278 which is disposed above and engages pin 256, arm 278 being urged in a clockwise direction (or downwardly) as viewed in Figure 2 by means of the spring 280. The flapper arm lever 272 is also provided with the arm 282 adapted to be moved between upper and lower stops 284 and 286. Flapper arm lever 272 is also provided with the arm 288 which carries pivot 58 of the lever 56.

Assuming the control instrument has been installed to control a medium such as is illustrated in Figure 1, the bulb 18 is disposed in the medium, and, let it be assumed that the medium at the time of installation is at room temperature. Let it also be assumed that valve 10 is a direct acting valve, in which case links 52 and 88 will be in the full line positions as illustrated in Figure 1. If it is desired to maintain the medium to be controlled at a temperature above room temperature, for example 90°, knob 68 is rotated to disposed pointer 82 at 90° on the degrees lines 44 which are concentric with the chart 40, thus lowering the nozzle 104.

When the instrument is installed the disk 240 (Figure 3) is in its midposition on the screw 224 so that bellows 210 and 200 are in midposition whereby they have a maximum adjustment in both directions, and the nozzle is so set that when pointer 82 and arm 36 coincide the relay permits 7½ pounds to be supplied to the motor 46. This pressure of 7½ pounds is merely chosen as a mid-pressure between the maximum and minimum operating pressures of 15 pounds and zero pounds, respectively.

The instrument being thus set, when the knob 68 moves the pointer 82 to 90°, the nozzle 104 will move downwardly away from the flapper 122, flapper 122 being prevented from moving by means of the pin 62 which is linked to the Bourdon tube.

As the nozzle is moved away from the flapper 122, supply pressure through tube 134 will escape through said nozzle. As the pressure escapes from the nozzle it will be bled off from the low pressure cavity 138. Valves 146 and 156 will have been closed. Diaphragms 140 and 152 will move toward the right as viewed in Figure 1, causing valve 146 to remain closed and permitting valve 156 to move away from the diaphragm 152 to open position by means of the spring 158. Thus the pressure trapped in cavity 150 will bleed to the atmosphere through passages 162 and 166. This will permit pressure to be exhausted from the motor 46, causing valve 10 to open, supplying temperature to the medium to be controlled.

As the temperature of the medium to be controlled rises toward 90°, the temperature will affect the gas in bulb 18 and tube 20 increasing the pressure in the Bourdon tube 22, causing the end 24 thereof to move in a clockwise direction to move the pen 38 toward the 90° mark. Moving toward 90°, the Bourdon tube 22 will cause the arm 48 to move in a clockwise direction which lowers pin 62 permitting movement of the flapper 122 toward the nozzle 104, thereby diminishing the flow of fluid from the nozzle, thereby raising the pressure in tube 116. The increased pressure in tube 116 causes a raised pressure in cavity 138, and a continued building up of pressure causes the low pressure diaphragm 140 to move toward the left as viewed in Figure 1, moving the housing 154 toward the left until the exhaust valve 156 is closed.

Continued movement of the diaphragm 140 continues to move the housing 154 causing the closed valve 156 to open the supply valve 146 through stem 160. Operating fluid under pressure then is supplied from tube 134 past the supply valve 146 through tube 168 to the motor 46, causing the motor to move the valve 10 toward closed position. This condition continues until an automatic balance is struck between the heating medium supplied past valve 10 and the pressure in bulb 18, tube 20 and Bourdon tube 22, which is a direct function of the temperature.

If the instrument is not so adjusted that 7½ pounds pressure will cause proper operation of the valve 10 to cause the instrument to control at exactly the temperature set, then it is necessary to readjust the instrument. This is done by rotating the manual adjustment screw 224. Rotation of the screw 224 causes rotation of the flexible shaft 222 which in turn rotates pinions 220 and 190. Rotation of the pinion 190 causes the pinion shaft 188 to move upwardly or downwardly. For any given temperature, clockwise rotation of the screw 224 causes a movement of the flapper toward the nozzle which increases the pressure in tube 116.

Thus upward movement of the shaft 188 causes upward movement of the stop 244 which raises arm 254 and causes pin 256 to raise arm 278, thereby lowering arm 288 which lowers pivot 58 which in turn lowers pin 62, thereby permitting the flapper 122 to approach the nozzle, raising the pressure in tube 116, causing the operation of the relay as above described to supply pressure to the motor 46 for moving the valve 10 toward closed position.

In the event that this adjustment does not cause the pointer 82 and the arm 36 to remain in alignment due either to a wandering action of the arm 36 or a cycling movement of the arm 36, it is necessary to adjust the screw 268, which in turn will adjust the position of the pin 256 between levers 254 and 278 in the direction of their pivots. If the screw 268 is moved so that the dial 262 is set at zero, the pin 256 will be moved into alignment with the pivot 252 so that movement of the lever 250 will not in any way affect the flapper arm lever 278, whereby there will be no movement of the flapper by movement of the lever 250. In this zero position of dial 262, the slightest change of temperature of the medium to be controlled causes the Bourdon tube 22 to cause the lever 56 to pivot about the point 58 which will be fixed as it will not be affected by any movement of the lever 250, so that no changes in the pressure between bellows 200 and 210 will in any way effect a movement of the shaft 58. Thus the pin 62 will move the flapper 122 to open the nozzle, thereby causing a full movement of the valve 10 toward open or closed position, depending upon the direction of temperature change.

As the pin 256 is moved toward the left as viewed in Figure 3, that is, as the dial 262 is set away from zero, the more the operation of the bellows becomes effective to cancel out the control of the Bourdon tube 22. In other words, as the pin 256 is moved away from alignment with the axis 252, there is a combined controlling effect of the Bourdon tube 22 and the bellows.

Assuming the pin 256 to be in the position illustrated in Figure 3, pressure is supplied through tube 168, tube 170, to the cavity between the bellows, causing downward movement of the shafts 196 and 188 which in turn causes a downward movement of lever 254, and consequently a downward movement of lever 278. Downward movement of the lever 278 causes upward movement of lever 288, and consequently of pivot 58, causing an upward movement of pin 62 and a movement of the flapper 122 away from the nozzle 104. Thus as the pin 256 is moved toward the left more and more, there is a smaller and smaller amount of valve movement of the valve 10 for a given change in temperature.

By movements of the screws 268 and 224 a proper adjustment is effected whereby any selected temperature (or pressure) can be readily maintained.

It is to be understood that this application is not to be limited by the exact embodiments of the device shown, which are merely by way of illustration and not limitation as various and other forms of the device will, of course, be apparent to those skilled in the art without departing from the spirit of the invention or the scope of the claims.

I claim:

1. A device for establishing a pneumatic control pressure, comprising a condition responsive means, a pivotally mounted nozzle, output pressure from said nozzle adapted to be varied in proportion to the movement of the condition responsive means, a flapper valve pivotally mounted adjacent said nozzle and biased to a position to close said nozzle, the pivotal mounting of said nozzle and flapper being substantially in alignment, a flapper arm lever pivoted at a point spaced from the pivot of said flapper and movable between upper and lower extreme positions, said lever being provided with a lever arm extending toward the pivotal mounting of said flapper, a flapper control arm pivoted to said flapper arm lever at a point adjacent the pivotal mounting of said flapper, said flapper control arm having a member engageable with said flapper for regulating the position of said flapper with respect to said nozzle, the position of said flapper control arm being adapted to be determined by operation of condition responsive means, a pivotally mounted pinion shaft lever, said lever having a pinion shaft lever arm and a fulcrum pin arm, said flapper arm lever having a fulcrum pin lever arm disposed adjacent said fulcrum pin arm, a fulcrum pin between said fulcrum pin lever arm and fulcrum pin arm and movable therebetween whereby movement of said pinion shaft lever variably moves said flapper arm lever, and control mechanism for moving said pinion shaft lever, said control mechanism comprising a flexible bellows adapted to be controlled in its movement by the output pressure from said nozzle, a pinion shaft engaging said pinion shaft lever arm and carried by said bellows, movement of said bellows bodily moving said shaft, a pinion on said pinion shaft, and manually controllable means for rotating said pinion shaft to move it bodily with respect to said bellows to selected positions.

2. A device for establishing a pneumatic control pressure, comprising a condition responsive means, a pivotally mounted nozzle, output pressure from said nozzle adapted to be varied in proportion to the movement of the condition responsive means, a flapper valve pivotally mounted adjacent said nozzle and biased to a position to close said nozzle, the pivotal mounting of said nozzle and flapper being substantially in alignment, a flapper arm lever pivoted at a point spaced from the pivot of said flapper and movable between upper and lower extreme positions, said lever being provided with a lever arm extending toward the pivotal mounting of said flapper, a flapper control arm pivoted to said flapper arm lever at a point adjacent the pivotal mounting of said flapper, said flapper control arm having a member engageable with said flapper for regulating the position of said flapper with respect to said nozzle, the position of said flapper control arm being adapted to be determined by operation of condition responsive means, a pivotally mounted pinion shaft lever, said lever having a pinion shaft lever arm and a fulcrum pin arm, said flapper arm lever having a fulcrum pin lever arm disposed adjacent said fulcrum pin arm, a fulcrum pin between said fulcrum pin lever arm and fulcrum pin arm and movable therebetween whereby movement of said pinion shaft lever variably moves said flapper arm lever, said pinion shaft lever being adapted to be moved by control mechanism associated therewith.

3. A control mechanism for a device of the character described comprising a cylindrical member vented to atmosphere adjacent one end thereof and closed adjacent the other end, a pair of flexible bellows disposed in said cylindrical member, said bellows being disposed one within the other and having their open ends secured to the closed end of said cylindrical member, said bellows being secured together at their closed ends, resilient means between said cylindrical member and bellows and between said bellows for positioning said bellows, a pressure connection communicating with the space between said bellows, a threaded adjusting shaft secured to said bellows within the inner of said bellows, a pinion bearing carried by the closed end of said cylindrical member and having a sleeve portion embracing said adjusting shaft, a pinion shaft threaded to said adjusting shaft, and extending outwardly of said cylindrical member through said pinion bearing, rotation of said pinion shaft moving said pinion shaft bodily with respect to the closed end of said cylindrical member, and means for rotating said pinion shaft.

4. A device for establishing a pneumatic control pressure, comprising a condition responsive means, a pivotally mounted nozzle, output pressure from said nozzle adapted to be varied in proportion to the movement of the condition responsive means, a flapper valve pivotally mounted adjacent said nozzle and biased to a position to close said nozzle, a flapper arm lever pivoted at a point spaced from the pivot of said flapper, said lever having a lever arm, a flapper control arm pivoted to said flapper arm lever, said flapper control arm having a member engageable with said flapper for regulating the position of said flapper with respect to said nozzle, the position of said flapper control arm being adapted to be determined by operation of condition responsive means, a pivotally mounted pinion shaft lever, said lever having a pinion shaft lever arm and a fulcrum pin arm, said flapper arm lever having a fulcrum pin lever arm disposed adjacent said fulcrum pin arm, a fulcrum pin between said fulcrum pin lever arm and fulcrum pin arm and movable therebetween whereby movement of said pinion shaft lever variably moves said flapper arm lever, said pinion shaft lever being adapted to be moved by control mechanism associated therewith.

5. A device for establishing a pneumatic control pressure, comprising a condition responsive means, a pivotally mounted nozzle, output pressure from said nozzle adapted to be varied in proportion to the movement of the condition responsive means, a flapper valve pivotally mounted adjacent said nozzle and biased to a position to close said nozzle, a flapper arm lever pivoted at a point spaced from the pivot of said flapper, said lever having a lever arm, a flapper control arm pivoted to said flapper arm lever, said flapper control arm having a member engageable with said flapper for regulating the position of said flapper with respect to said nozzle, the position of said flapper control arm being adapted to be determined by operation of condition responsive means, a pivotally mounted pinion shaft lever, said lever having a pinion shaft lever arm and a fulcrum pin arm, said flapper arm lever having a fulcrum pin lever arm disposed adjacent said fulcrum pin arm, a fulcrum pin between said fulcrum pin lever arm and fulcrum pin arm and movable therebetween whereby movement of said pinion shaft lever variably moves said flapper arm lever, and control mechanism for moving said pinion shaft lever, said control mechanism comprising a flexible bellows adapted to be controlled in its movement by the output pressure from said nozzle, a pinion shaft engaging said pinion shaft lever arm and carried by said bellows, movement of said bellows bodily moving said shaft, a pinion on said pinion shaft, and manually controllable means for rotating said pinion shaft to move it bodily with respect to said bellows to selected positions.

CARL WILLIAM FISCHER.

REFERENCES CITED

The following references are of record in the file of this patent:

UNITED STATES PATENTS

| Number | Name | Date |
|---|---|---|
| 2,290,987 | Moore | July 28, 1942 |
| 2,297,361 | Mallory | Sept. 29, 1942 |
| 2,361,885 | Tate | Oct. 31, 1944 |
| 2,366,246 | Erbguth | Jan. 2, 1945 |